Figure 1:
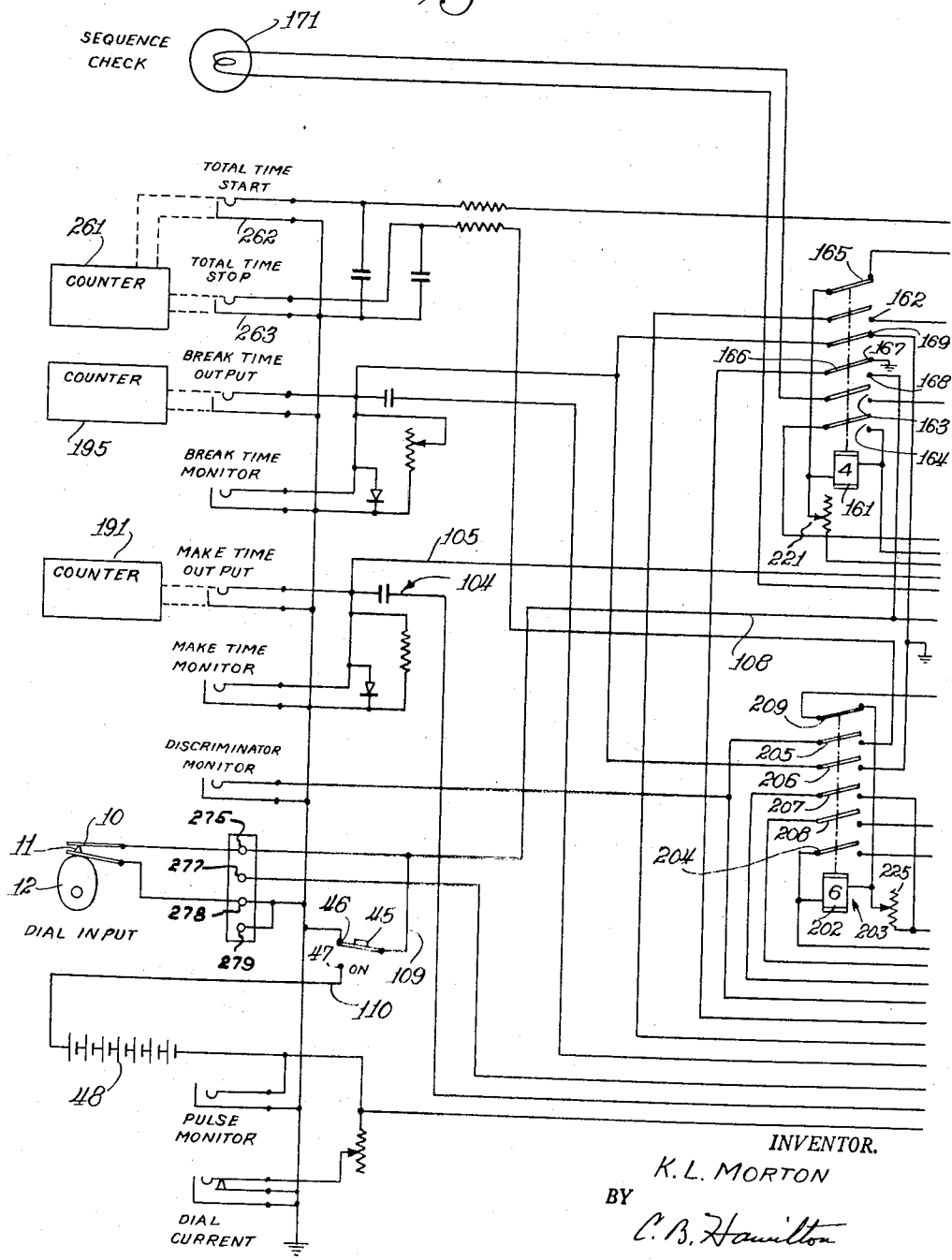

March 10, 1959

K. L. MORTON 2,877,405

APPARATUS FOR TESTING ARTICLES

Filed April 29, 1954

3 Sheets-Sheet 1

INVENTOR.
K. L. MORTON
BY
C. B. Hamilton
Atty.

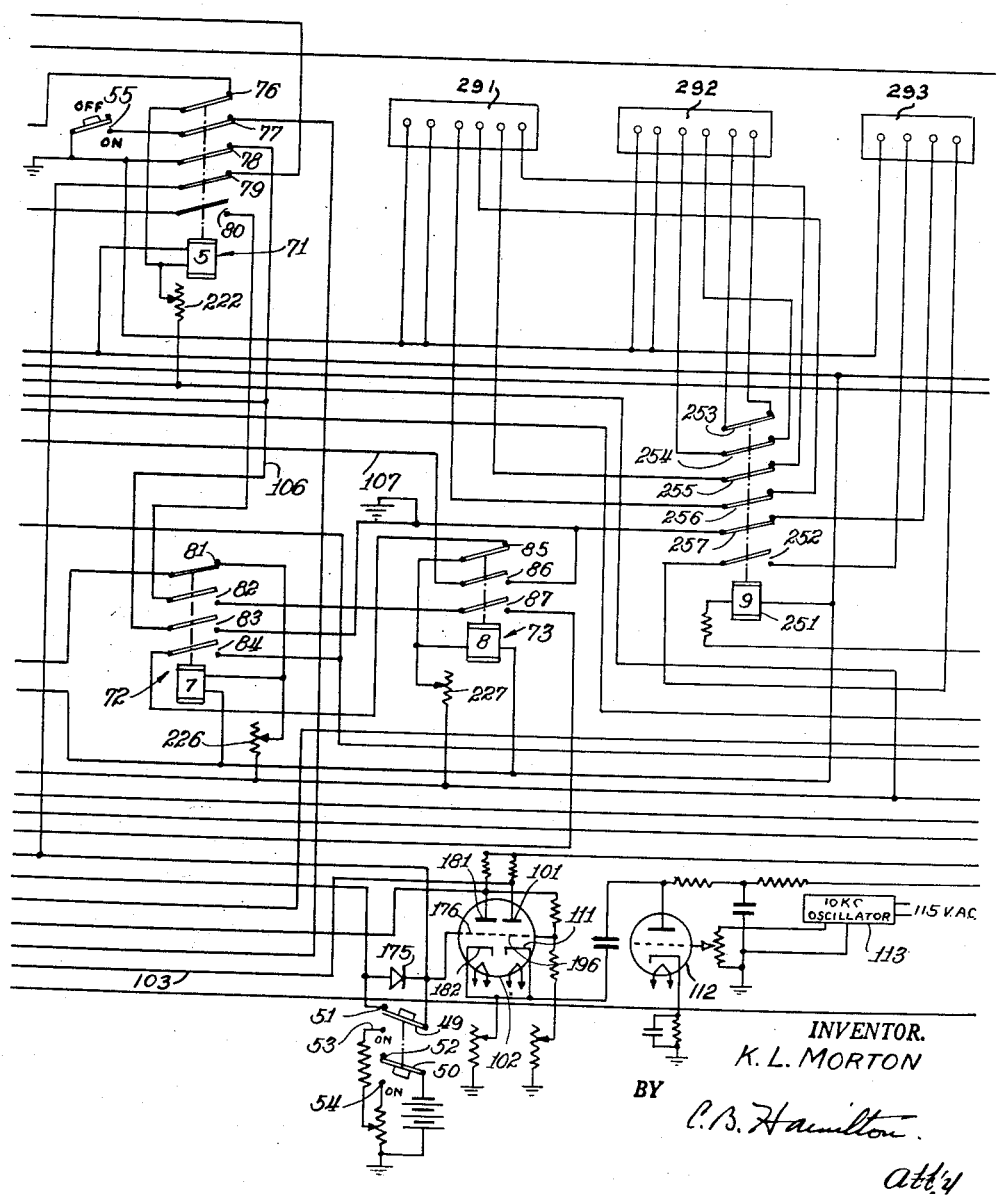

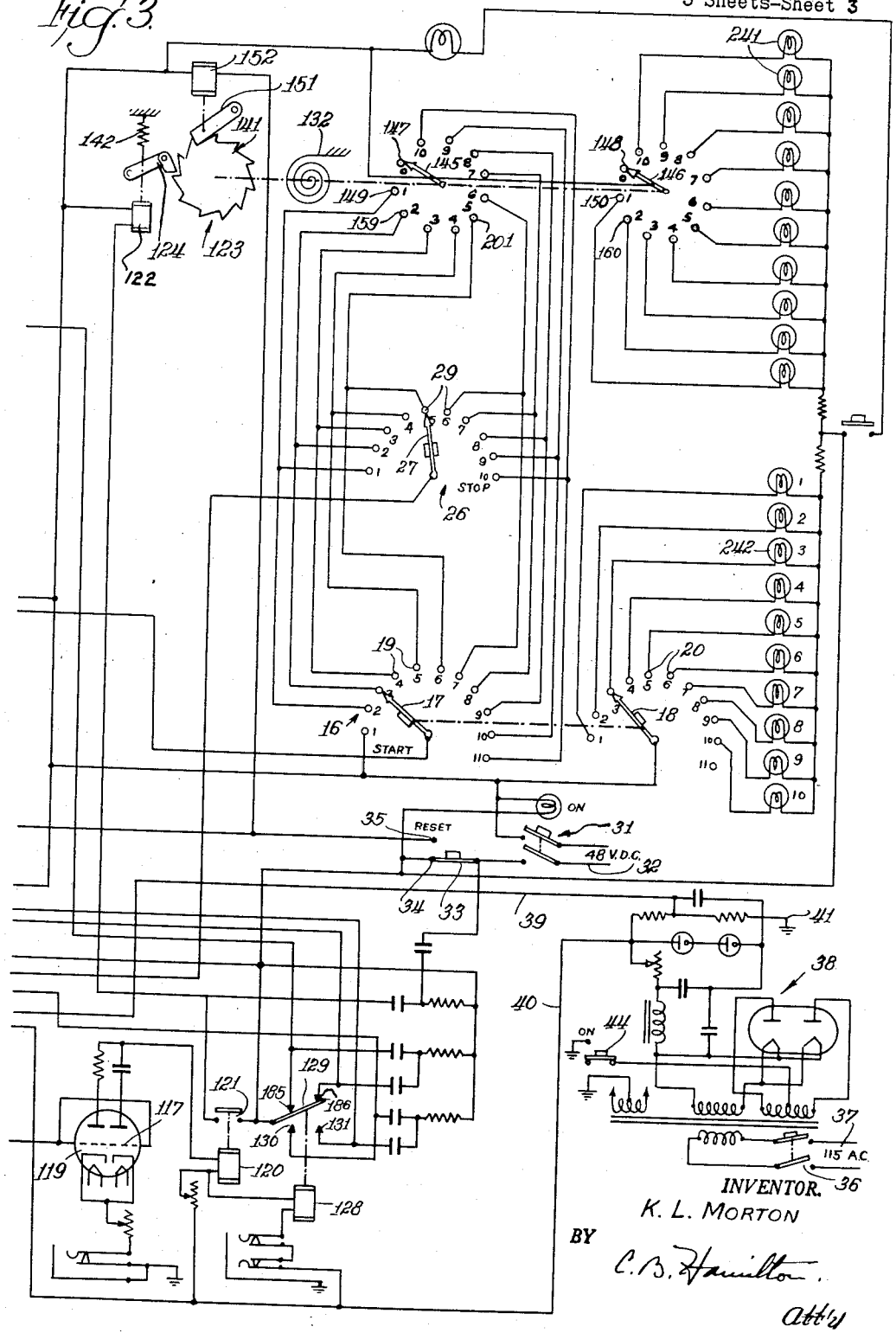

United States Patent Office 2,877,405
Patented Mar. 10, 1959

2,877,405

APPARATUS FOR TESTING ARTICLES

Kenneth L. Morton, Indianapolis, Ind., assignor to Western Electric Company, Incorporated, New York, N. Y., a corporation of New York Application April 29, 1954, Serial No. 426,448

12 Claims. (Cl. 324—28)

This invention relates to apparatus for testing articles, and more particularly to apparatus for measuring selected numbers of periods of time in which electrical contacts, intermittently actuated a predetermined number of times, are open and the periods of time the contacts are closed.

In testing contacts of a telephone dial, which, when operated, opens and closes the contacts a predetermined number of times, it is highly advantageous to be able to compare any one or groups of the makes or breaks of the contacts with other makes or breaks thereof. That is, it is highly advantageous for process control purposes to be able to compare the makes or breaks of the contact of a dial occurring late in a single operation of the dial with the makes and breaks occurring earlier in an operation of the dial. For example, it may be desirable to compare the make time of the ninth occurring make with that of the third occurring make. The apparatus disclosed in my copending application Serial No. 316,531, filed October 23, 1952, for "Apparatus for Testing Articles," now Patent No. 2,828,465, serves to test the total time of all the makes or breaks of a dial actuation, but will not measure any selected make or break, and no other apparatus is known for accomplishing this result.

An object of the invention is to provide new and improved apparatus for testing articles.

Another object of the invention is to provide new and improved apparatus for measuring selected numbers of periods of time in which intermittently actuated electrical contacts are open and the periods of time the contacts are closed.

A further object of the invention is to provide apparatus for measuring, in a telephone dial actuated to open and close contacts a predetermined number of times, the total time the contacts are closed and separately measuring the total time the contacts are fully open and closed for selected ones of the opening and closing of the contacts.

An apparatus illustrating certain features of the invention may serve to connect a source of high frequency current to one counter responsive to the frequency of the current when contacts of a dial being tested are closed and connect the source to a second counter when the contacts are open. Means are provided for selectively blocking the source of high frequency current from the counters for any desired number of makes and breaks of the contacts.

An apparatus illustrating a more specific embodiment of the invention may include a pair of vacuum tubes connected to a high frequency oscillator. A counter responsive to the frequency of electric current supplied thereto is connected in the plate circuit of one of the tubes, and a second, similar counter is connected in the plate circuit of the other tube. Means are provided for connecting contacts to be tested to the control grid of one of the tubes to fire that tube when the contacts are fully open, and an adjustable attenuator connects the plate of the last-mentioned tube to the control grid of the other tube to fire the latter tube when the contacts are fully closed. Thus, one of the counters is actuated when the contacts are fully closed, and the other counter is actuated when the contacts are fully open. A stepping relay may be provided for stopping the actuation of the counters when the contacts have been opened and closed a predetermined number of times, and a selectively operable switch may be set to provide for actuation of the counters for any times of said predetermined number.

A complete understanding of the invention may be obtained from the following detailed description of an apparatus forming a specific embodiment thereof, when read in conjunction with the appended drawing, in which Fig. 1 is a schematic view of a portion of a circuit forming one embodiment of the invention;

Fig. 2 is a schematic view of another portion of the circuit, the lefthand portion of Fig. 2 fitting to the right-hand portion of Fig. 1, and Fig. 3 is a schematic view of the remainder of the circuit, the lefthand portion of Fig. 3 fitting to the right-hand portion of Fig. 2.

Referring now in detail to the drawing, there is shown therein a testing circuit for measuring very accurately the total time spring contacts 10 and 11 of a telephone dial are fully closed and the total time the contacts 10 and 11 are fully open as the contacts are periodically closed and permitted to open by a cam 12. Since the contacts 10 and 11 and the cam 12 are part of a telephone dial, the cam 12 is rotated ten revolutions for a single full operation of the dial, starting with the contacts 10 and 11 closed and ending with the contacts closed, the contacts being closed ten times and opened ten times. The apparatus may measure the time of any selected one or group of consecutive closings and openings of the contacts.

To start a test, a manually operable starting selector switch 16 is actuated to set contactors 17 and 18 in engagement with the one of contacts 19 and 20, respectively, at which it is desired to start measurement. The contacts 19 and 20 are numbered from one to eleven and correspond to the number of times the contacts 10 and 11 are opened and closed for one complete operation of the dial. The number of the contact 19 engaged by the contactor 17 determines the number of the opening of the contacts 10 and 11 at which begins the measurement of the operation of the contacts 10 and 11. Thus, for example, if the contactor 17 is set in engagement with the fifth contact 19, the timing measurement of the contacts 10 and 11 will begin with the fifth opening of the contacts 10 and 11. A contactor 27 of a stop switch 26 is set on a contact 29 to preselect the cutoff point in the measurement of the operation of the contacts 10 and 11.

To completely set up the circuit for testing, a switch 31 in a powerline 32 is closed, a reset switch contact 33 is left in engagement with a contact 34 and out of engagement with a resetting contact 35, a switch 36 in a powerline 37 is closed to supply power to a rectifier circuit 38 having positive conductors 39 and 40 and a grounded conductor 41, a switch 44 is closed, a toggle switch contactor 45 is moved out of engagement with a grounded contact 46 and into engagement with a contact 47 leading to a fifteen volt battery 48, toggle switch contactors 49 and 50 are moved out of engagement with contacts 51 and 52 and are set in engagement with contacts 53 and 54, and a toggle switch 55 is closed. When the switch 31 is closed, a bias current is applied to relays 71, 72 and 73, which speeds operation upon operating pulses occurring later. The relay 71, when energized, breaks contacts 76, 77, 78 and 79 and makes contacts 80, the relay 72 breaks contacts 81 and makes contacts 82, 83 and 84, and the relay 73 breaks contacts 85 and makes contacts 86 and 87.

Assuming the dial to be fully wound up and just released with the contacts 10 and 11 initially closed and the contactors 17 and 18 to be set in engagement with the number 3 contacts 19 and 20 to start the test on the third opening of the contacts 10 and 11 and the contactor 27 to be set on the number 5 contact 29, the dial is released and opens and closes the contacts 10 and 11 ten times as it runs down. On each opening of the contacts 10 and 11, a resistive load is removed from the battery 48 and a higher voltage is impressed on a plate 101 of a tube 102 through a conductor 103, a resistance capacitance network 104, conductors 105 and 106, contacts 83 and 86 and conductors 107, 108, 109 and 110. This causes increased current to flow from a cathode 111 to the plate. This raises the plate voltage of an amplifier tube 112 to amplify oscillations of a well known oscillator 113, which is set for a predetermined output of, for example, ten kilocycles per second.

The opening of the contacts 10 and 11 raises the bias voltage on a grid 117 of a tube 119 from the battery 48 to increase the conductivity of the tube 119, which energizes a relay 120 to close contacts 121 to energize a relay winding 122 of a well known type of stepping relay 123 which turns contactors 145 and 146. The tube 119 also actuates a relay 128 to move a contactor 129 connected to the negative side of the powerline 32 to engagement with contacts 130 and 131 and out of engagement with contacts 185 and 186. Then, as the cam 12 recloses the contacts 10 and 11, the tube 119 is made non-conductive and the relays 120, 122 and 128 are deenergized to cock the pawl 124 one notch on a ratchet wheel 141 through the action of a return spring 142. The ratchet wheel 141 serves to turn contactors 145 and 146 out of engagement with number 0 contacts 147 and 148 and into engagement with number 1 contacts 149 and 150, and a latching pawl 151 of a resetting relay 152 holds the ratchet wheel and the contactors 145 and 146 in the latter positions against the effect of a spiral return spring 132.

On the next or second closing of the contacts 10 and 11, the relay 120 is deenergized to cock the pawl 124, and the instant of the third opening of the contacts 10 and 11, the relays 120 and 122 are energized to again turn the ratchet wheel 141 to move the contactors 145 and 146 away from the contacts 149 and 150 and into engagement with next contacts 159 and 160. The engagement of the contactor 145 with the contact 159 connects the contactor 145 to the contactor 17 of the selector switch 16 to actuate a relay 161, which closes contacts 162, 163 and 164, opens contacts 165 and 169 and moves a contactor 166 out of engagement with a grounded contact 167 and into engagement with a contact 168. The contacts 164 lock in the relay 161, the contacts 163 light an indicating lamp 171, the contactor 166 and the contact 168 connect the battery 48 to a rectifier 175 and a grid 176 to increase current flow between a plate 181 and a cathode 182 of the tube 102. This superposes the ten kilocycle current from the oscillator 113 on the power supply 38.

Also, whenever the contacts 10 and 11 close, the battery 48 is shunted to ground which lowers the voltage on the grid 117 to make the tube 119 less conductive and the relay 128 is deenergized to move the contactor 129 into engagement with contacts 185 and 186 and out of engagement with the contacts 130 and 131.

The oscillating current from the oscillator 113 is coupled through the plate 101 and the cathode 111 to a totalizer type electronic counter 191, which is pulse-responsive and measures the number of pulses of the oscillator while the contacts 10 and 11 are closed to make the plate 101 and the cathodes 111 conductive. The network 104 couples the counter and the oscillator.

As the contacts 10 and 11 reopen, the voltage of the grid 176 is raised to make the plate 181 and the cathode 182 conductive to pulse a totalizer type electronic counter 195 with oscillations from the oscillator 113, and the plate 181 and cathode 182 being conductive, the voltage of a grid 196 drops to cut off current flow between the plate 101 and the cathode 111 to stop the counter 191. Thus, the counter 195 is actuated while the contacts 10 and 11 break (are open) and the counter 191 is actuated while the contacts are closed.

As the contacts 10 and 11 close the fifth time the grid 117 of the vacuum tube 119 goes negative and conduction in the tube 119 ceases. Relays 120 and 128 are released allowing relay 122 to latch with the contactor 145 connected to a contact 201 which energizes a relay 203 through the contact 29 and contactor 27. Contacts 204, 205, 206, 207 and 208 are closed and contacts 209 are opened.

The contacts 169 and 206 are in parallel with one another to ground, and whenever either pair of contacts is closed, operation of the counter 195 is prevented. Thus, for the counter to be operated during the breaks of the contacts 10 and 11, the relay 161 must be in an actuated condition and the relay 203 must be deenergized. The relay 161 is actuated during the make time preceding the first break to be measured, and the relay 203 is actuated during the make time of the contacts 10 and 11 following the last break time to be measured.

For the make time measurements by the counter 191, the relay 161 is actuated during the second closing of the contacts 10 and 11 through the normally closed contacts 165, the contact 185 and the contactor 129, which shunt a bias potentiometer 221. The relay 161 pulls up to shunt a bias potentiometer 222 through the contacts 162, 76, 185 and 129 when the relay 128 is next energized, and this actuates the relay 71 to pull up, the contacts 76 being broken to bring the potentiometer 222 back in series with the relay 71 and the bias current being sufficient to hold the relay in its actuated condition. When the relay 71 is actuated it opens the contacts 78 to disconnect the conductor 105 to the counter 191 from ground to enable the counter to be pulsed by pulses through the coupling network 104.

Potentiometers 225, 226 and 227 normally limit current through the relays 203, 72 and 73, respectively, to a value sufficient to hold these relays in actuated conditions after the relays once have been actuated, but limit the current to a value which in itself is insufficient to actuate these relays. When the relay 123 steps the contactor 145 into engagement with the contact 201, the contactor 27 connects the positive side of the powerline 32 to the relay winding 202, and the contacts 209, 186 and 129 shunt the potentiometer 225 to actuate the relay 203. The relay 203 pulls up and stays in this condition, and, the contact 208 being closed, shunts the bias potentiometer 226 through the contacts 81, 130 and 129, and the relay 72 is pulled up. The contacts 81 are opened, but the bias potential on the relay 72 is sufficient to keep it pulled up. When the relay 72 closes the contacts 84 as it is actuated, the bias potentiometer 227 is shunted by the contacts 84, 85, 86 and 129 and the relay 73 is pulled up.

As the relay 123 steps, the contactor 146 thereof lights lamps 241 one after another, and on the occurrence of the pulse first to be measured, the contactor 18 lights a lamp 242 numbered to indicate the start of the test. When the test has been completed, and all the relays 71, 72, 73, 161 and 203 have been pulled up and held in this condition, the lamp 171 is lighted through contacts 163 of the relay 161, the contacts 80 of the relay 71, the contacts 82 of the relay 72, the contacts 87 of the relay 73 and the contacts 207 of the relay 203. The lamp 171 is for the purpose of indicating a completed test.

When the reset contactor 33 is moved from the contact 34 to the contact 35, the relays 71, 72, 73, 161 and 203 are dropped out and relays 152 and 251 are energized. The relay 251 makes contacts 252 and breaks contacts 253, 254, 255, 256 and 257. A timer 261 of a well known type, which starts when pulsed once, connected to jacks 262 and 263 is started when the relay 161 is pulled up to move the contactor 166 into engagement with the contactor 168 through a circuit including these contacts, the battery 48, the contacts 79 and the jack 262. The counter 261 then runs until the relay 203 is pulled up to make the contacts 205, and then stops. This gives the total time of the measuring of the contacts for purposes of checking the make and break counters.

The shunt delay time of auxiliary contacts (not shown) of the dial may be measured by placing the start and stop switches 16 and 26 in the "11" position and the switch 55 in the "on" position, connecting one pulsing contact to a terminal 275 of a connector block 276 and the other pulsing contact and one shunt contact to a terminal 277 and the remaining shunt contact is connected to a terminal 277. The dial is swung to zero, and the delay time from the tenth make of the pulsing contacts to the opening of the shunt contacts of the dial will be displayed on the make time counter 191.

Delay time of series contacts (not shown) of the dial may be measured by placing the start and stop switches 16 and 26 in the "11" position and the switch 55 in its "off" position, the pulsing contacts 10 and 11 of the dial are connected to the terminals 275 and 277 of the connector block 276 and the series contacts to J12 of the dial are connected to a jack 285. The dial then is wound to "0," and the series delay time from the tenth make of the pulsing contacts to the closing of the series contacts will be displayed on the make time counter. Since the series contacts under test are bridged across the timing frequency input to the tube 102, when the series contacts close, the timing frequency is bypassed to ground, thus terminating the series delay timing.

The contacts 33 and 35 reset the step selector relay 123 and operates relays 251, which in turn resets the electronic counters by suitable connections between the counters and connector blocks 291, 292 and 293.

Operation

To set up the circuit for testing, the contacts 10 and 11 are connected to contacts 275 and 278, the switches 31, 36 and 44 are closed. The toggle switch contactor 45 is moved out of engagement with the grounded contact 46 and into engagement with the contact 47 leading to the fifteen volt battery 48, the toggle switch contactors 49 and 50 are moved out of engagement with contacts 51 and 52 and are set in engagement with contacts 53 and 54, and the toggle switch 55 is closed. When the switch 31 is closed, relays 71, 72 and 73 are set up to be later energized.

Assuming the third, fourth and fifth makes and breaks are to be measured, the contactors 17 and 18 are set in engagement with the number 3 contacts 19 and 20 to start the test on the third opening of the contacts 10 and 11 and the contactor 27 is set on the number 5 contact 29. The dial then is fully wound manually and is released to open and close the contacts 10 and 11 ten times as it runs down. At the fully wound position, the contacts 10 and 11 are closed, and, as the contacts 10 are opened, the tube 119 is made conductive to energize the relays 120 and 128. The relay 120 actuates the relay winding 122 to step the contactors 145 and 146 from their number "0" positions to their number "1" positions. As the contacts close, the tube 119 is made non-conductive and the relays 120, 128 and 123 drop out. The counters 191, 195 and 261 are not actuated by these pulses because the relays 71, 161 and 203 are deenergized at this time. The relay 123 is stepped one contact each time the contacts 10 and 11 break or open, and on the second break the contactor 145 engages the number "2" contact 159 to set up the relay 161 through the contactor 17 and the number "3" contact 19. Then as the contacts 10 and 11 make or close the second time (exclusive of the initially closed condition), the relay 128 is deenergized and the relay 161 is pulsed, bypassing the resistor 221, through a circuit including the powerline conductor 32, the contactor 129, the contacts 185 and 165, the relay 161, the contactor 17, the number "3" contact 19, the contact 159, the contactor 145 and the other side of the powerline 31. The relay 161 then pulls up, the contactor 166 making contact with the contact 168 before breaking contact with the contact 167. The bias current through the potentiometer 221 then is sufficient to keep the relay 161 locked in an energized condition.

The energization of the relay 161 breaks the contacts 169 to set up the break counter 195 for operation on the third opening of the contacts 10 and 11 which makes the plate 181 and cathode 182 conductive. When the third opening of the contacts 10 and 11 occurs, the counter 195 is actuated by the pulses from the oscillator 113 for the duration of the break and does not reset on subsequent makes and breaks of the contacts 10 and 11.

On the third break of the contacts 10 and 11 and energization of the relays 120 and 128, the relay 71 is pulsed through the contactor 129, contacts 131, contacts 162 of the relay 161 and contacts 76 shunting the bias resistor 222. The relay 71 pulls up and is held up by the bias current for the rest of the operation. This opens the contacts 78 to set up the counter 191 for the next or third make of the contacts 10 and 11. The counter 191 is pulsed by the oscillator 113 the third, fourth and fifth makes of the contacts 10 and 11, and totalizes these pulses.

On the fifth break of the contacts 10 and 11, the relay 123 steps the contactor 145 into engagement with the contact 201 to set up the relay 203 for operation when the relays 120 and 128 drop out at the fifth make. When the fifth make occurs, the relay is energized through a circuit including the upper conductor of the powerline 32, the contactor 145, the contact 201, the fifth contact 29, the contactor 27, the winding 202, the contacts 209, the contact 186, the contactor 129 and the bottom conductor of the powerline 32. The relay 203 pulls up and is kept up through the potentiometer 225 for the rest of the test. This closes the contacts 206 to shunt the break counter 195 to ground to prevent further operation of the break counter for the rest of the test. The contacts 204 and 208 of the relay 203 also are closed to set up the relay 72 when the sixth break of the contacts 10 and 11 occurs. On the sixth break, the relay 128 is energized to actuate the relay 72 through a circuit including the bottom conductor of the powerline 32, the contactor 129, the contact 130, the contacts 208 of the relay 203, the contacts 81 and the relay winding of the relay 72 and the upper conductor of the powerline 32. When the relay 72 is energized, it remains so from the bias current through the potentiometer 226 until the test set is reset and closes contacts 82, 83 and 84, the contacts 83 shunting the make counter 191 to ground to prevent further operation thereof.

The contacts 10 and 11 continue to break and make until the dial runs down and the tenth opening and closing thereof occur. The reset switch then is closed to reset the relay 123 and actuate the relay 251 to reset the counters. Then the contacts 10 and 11 are removed after opening the switch 31, after which the other set of contacts are connected to the test set for measurement thereof.

The set may be used for obtaining statistical data on time variations of contacts caused by repeated operations, changed atmospheric conditions, or product design changes. While the set was designed primarily for telephone dial measurements, other test applications include, step selectors, ratchet or impulse relays, multiple sequence switching and a sequence of voltage pulses of similar or of varying widths. It serves to measure the make, break and total times of any selected consecutive breaks and makes of the contacts 10 and 11.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing articles, which comprises a pair of counters for counting current oscillations, a source of alternating current of a predetermined frequency, electronic gating means responsive to each operation of contacts being tested while operated periodically a predetermined number of times for alternately connecting the current source to the counters, means for blocking the pulses from the counters, and stepping means for rendering the blocking means ineffective for any selected operation of the contacts.

2. An apparatus for testing articles, which comprises a pair of counters for counting current oscillations, a source of alternating current of a predetermined frequency, electronic gating means responsive to operation of contacts being tested while operated periodically a predetermined number of times for alternately connecting the current source to the counter, stepping means operable by each operation of the contacts, and means operable by the stepping means for blocking the pulses from the counters after a predetermined number of operations of the contacts.

3. An apparatus for testing articles, which comprises a counter for counting current oscillations, a source of alternating current of a predetermined frequency, electronic gating means responsive to operation of contacts being tested while operated periodically a predetermined number of times for alternately connecting the current source to the counters, adjustable blocking means for blocking operation of the counters, stepping means operable by operation of the contacts for rendering the first blocking means ineffective after a predetermined number of operations of the contacts, and a second adjustable blocking means operable by the stepping means after a predetermined number of operations of the contacts for again blocking operation of the counters.

4. An apparatus for testing articles, which comprises a counter for counting current oscillations, a source of alternating current of a predetermined frequency, electronic gating means for connecting the current source to the counter while contacts being tested and operated periodically a predetermined number of times are operated, stepping relay means operable by each operation of the contacts, a relay circuit having contacts connected to block current oscillations from the counter, manually operable selector switch means associated with the stepping means for preventing operation of the relay circuit for a predetermined number of operations, and manually operable selector switch means associated with the stepping relay means for maintaining operation of the relay circuit after the contacts have been operated a predetermined number of times.

5. An apparatus for testing articles, which comprises a counter for counting current oscillations, a source of alternating current of a predetermined frequency, electronic gating means for connecting the current source to the counter while contacts being tested and operated periodically a predetermined number of times are operated, stepping switch means operable by each opening of the contacts, relay means normally operable for blocking operation of the counter, adjustable switch means associated with the stepping switch means for actuating the relay means to permit operation of the counter after a predetermined number of operations of the contacts, and adjustable switch means associated with the stepping switch means for actuating the relay means to prevent operation of the counter after it has been actuated during a predetermined number of operations of the contacts.

6. An apparatus for testing articles, which comprises a counter for counting current oscillations, a source of alternating current of a predetermined frequency, electronic gating means for connecting the current source to the counter while contacts being tested and opened and closed periodically a predetermined number of times are closed, stepping relay means operable by each opening of the contacts, a relay blocking circuit having contact means connected between the counter and gating means for blocking passage of pulses to the counter, selector switch means associated with the stepping means for operating said relay blocking circuit, a second selector switch means associated with the stepping relay means, and a second relay blocking circuit operated by the stepping relay means through the second selector switch for preventing operation of the counter after it has been actuated during a predetermined number of openings and closings of the contacts.

7. An apparatus for testing articles, which comprises a counter for counting current oscillations, a source of alternating current of a predetermined frequency, electronic gating means for connecting the current source to the counter while contacts being tested and opened and closed periodically a predetermined number of times are open, a first relay circuit having contact means connected between said gating means and said counter for blocking passage of pulses to the counter, stepping relay means operable by each opening of the contacts, selector switch means associated with the stepping means for operating said first relay circuit to permit operation of the counter for a predetermined number of consecutive openings and closings of the contacts, a second selector switch means associated with the stepping relay means, and a second relay circuit operated by the stepping relay means through the second selector switch for preventing operation of the counter after it has been actuated during a predetermined number of openings and closings.

8. An apparatus for measuring the make time and the break time of contacts of a dialing mechanism which opens and closes the contacts a predetermined number of times, which comprises a totalizing make counter responsive to alternating current for counting oscillations of the current, a totalizing break counter responsive to alternating current for counting oscillations of the current, a circuit connected to the contacts for supplying current thereto, an oscillator for generating a signal of a predetermined frequency, an electronic tube circuit responsive to closure of the contacts for connecting the oscillator to the make counter while the contacts are closed, a second electronic tube circuit responsive to opening of the contacts for connecting the oscillator to the break counter while the contacts are open, relay means for shunting from the make counter the pulses from the first tube circuit, relay means for shunting from the break counter the pulses from the second tube circuit, stepping relay means operable by each opening of the contacts, adjustable selector switch means associated with the stepping relay means for rendering the relay means inoperative to shunt the pulses on any selected operation of the stepping relay means, and second adjustable selector switch means for rendering the relay means inoperative to shunt the pulses from the counters on any selected operation of the stepping relay means.

9. An apparatus for measuring the make time and the break time of contacts of a dialing mechanism which opens and closes the contacts a predetermined number of times, which comprises a totalizing make counter responsive to alternating current for counting oscillations of the current, a totalizing break counter responsive to alternating current for counting oscillations of the current, a circuit connected to the contacts of the dialing mechanism for supplying current thereto, an oscillator, an electronic tube circuit including the oscillator responsive to opening of the contacts for supplying alternating current of a predetermined frequency to the break counter while the contacts are open, a second electronic tube circuit including the oscillator and biasing means connected to the plate circuit of the first tube circuit responsive to closure of the contacts for supplying alternating current of said frequency to the make counter, a steppable counting relay including a plurality of contacts, a contactor for sequentially engaging the contacts and stepping relay means for moving the contactor when actuated, means responsive to the dialing mechanism contacts for actuating the stepping relay means when the dialing mechanism contacts are opened, a shunting circuit including the contactor and a contact of the counting relay thereof normally shunting the pulses from the counters rendered inoperative to shunt after the stepping relay means has been actuated a predetermined number of times, and a second circuit including the contactor and one of the contacts of the counting relay for rendering the shunting circuit operable after the stepping relay means has been actuated a predetermined number of times.

10. An apparatus for measuring time intervals of opening and closing of periodically operated contacts, which comprises a counter actuated in accordance with the receipt of current impulses, an electronic gating means operated by the contacts being tested and being connected to the counter, a source of constant frequency pulses for modulating the output of the electronic gating means, relay means for blocking the output of the electronic means to the counter, a stepping means operated by each actuation of the contacts being tested for operating the relay means, and selectively settable means for precluding operation of the relay means.

11. An apparatus for measuring the time of operation of periodically operated contacts, which comprises a pair of counters, an electronic gating means having a pair of triodes connected to operate said counters, means connected to the contacts under test for alternately operating said triodes in accordance with the opening and closing of said contacts, a source of constant frequency pulses for modulating the output of said triodes, a relay circuit having contactor means for blocking the output from said triodes, and means responsive to a predetermined number of operations of said contacts under test for operating said relay means.

12. An apparatus for measuring the time of operation of periodically operated contacts, which comprises a counter responsive to electrical pulses, a source of constant frequency electrical pulses, an electronic gating means interconnecting the source of pulses and the counter, means connected to the contacts being tested for periodically conditioning the electronic gating means to pass pulses to the counter, a relay circuit having contact means connected to said electronic gating means for blocking the pulses from the counter, and means responsive to a predetermined number of operations of the contacts for operating the relay circuit.

References Cited in the file of this patent
UNITED STATES PATENTS

| | | |
|---|---|---|
| 2,535,118 | Blashfield | Dec. 26, 1950 |
| 2,575,087 | Baker | Nov. 13, 1951 |
| 2,645,767 | Green | July 14, 1953 |
| 2,652,197 | Berger | Sept. 15, 1953 |